United States Patent [19]
McVeigh

[11] 3,759,608
[45] Sept. 18, 1973

[54] EYEGLASS FRAME ADJUSTER
[75] Inventor: William B. McVeigh, Teaneck, N.J.
[73] Assignees: Yvonne C. McVeigh; William B. McVeigh, Teaneck, N.J.
[22] Filed: Mar. 2, 1972
[21] Appl. No.: 231,188

[52] U.S. Cl. ............................................... 351/113
[51] Int. Cl. ............................................. G02c 5/14
[58] Field of Search .................... 351/111, 113, 118, 351/120, 121, 140, 141

[56] References Cited
UNITED STATES PATENTS

| | | | |
|---|---|---|---|
| 3,574,451 | 4/1971 | Lazazzera | 351/121 |
| 3,567,314 | 3/1971 | Speer | 351/113 |
| 2,756,632 | 7/1956 | Parsell | 351/121 |
| 2,887,929 | 5/1959 | Farmer | 351/118 |
| 3,545,848 | 12/1970 | Sebastian | 351/118 |
| 3,556,644 | 1/1971 | Stahl | 351/118 |

Primary Examiner—David Schonberg
Assistant Examiner—Paul A. Sacher
Attorney—Granville M. Brumbaugh et al.

[57] ABSTRACT

As described herein, an eyeglass frame adjuster comprises a slidable adjustment spring mounted within a stationary casing which is either clamped on the eyeglass frame arm or formed as an integral part of the arm. The adjustment spring includes calibrated teeth for releasably engaging serrations impressed in the casing. Angular adjustments in the arms of the eyeglass frame are made by varying the distance between the ends of the frame arms and the end portions of the frontal lens carrying frame by moving the spring lengthwise within the casing toward and away from the end portion of the frontal lens carrying frame.

8 Claims, 8 Drawing Figures

PATENTED SEP 18 1973
3,759,608
SHEET 1 OF 2
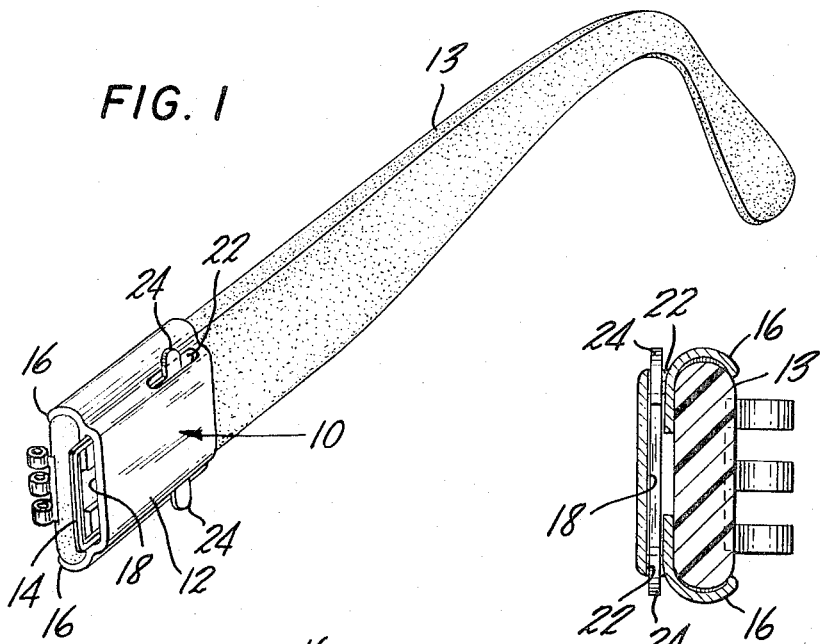
FIG. 1
FIG. 3
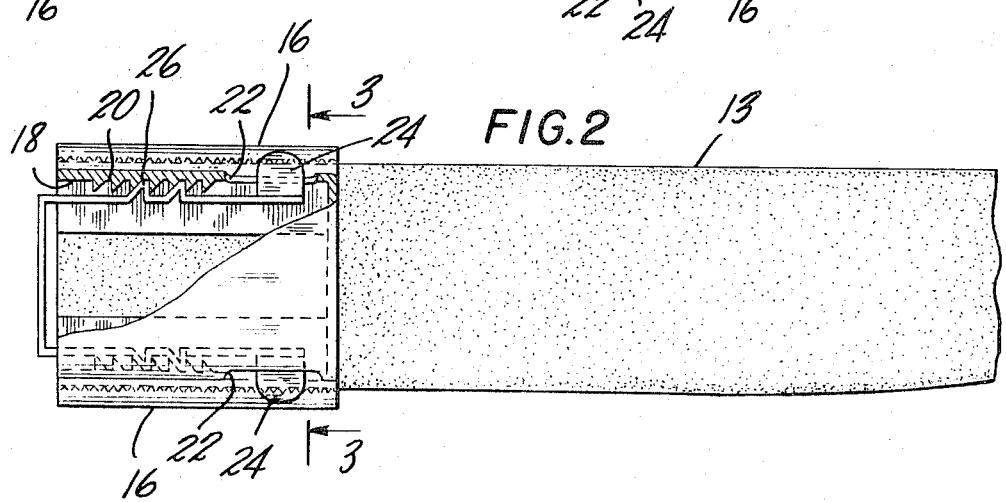
FIG. 2
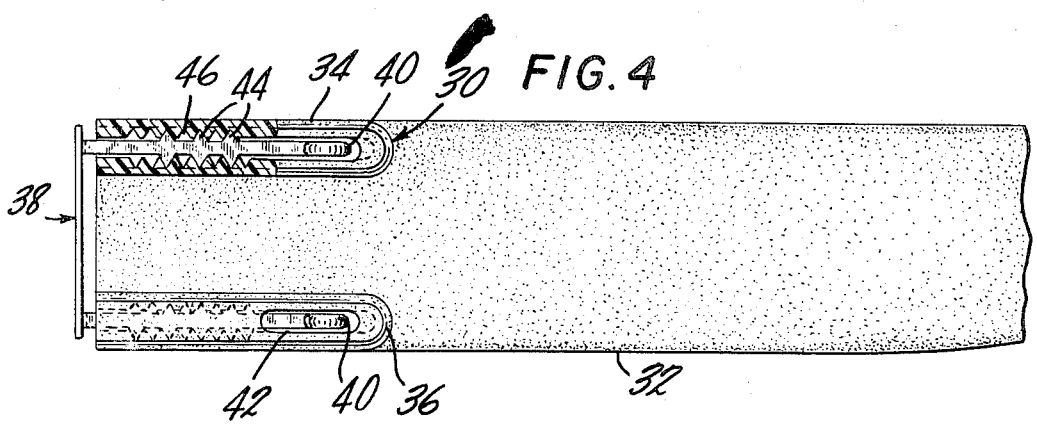
FIG. 4

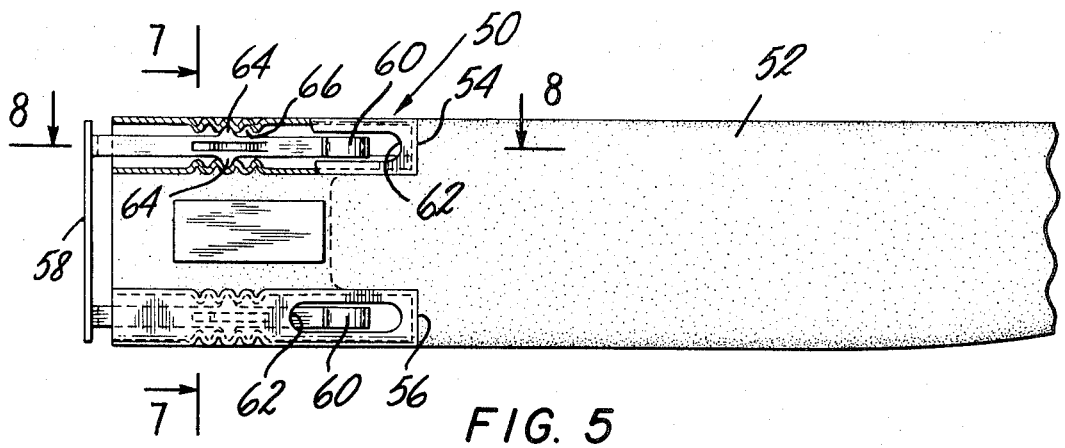
FIG. 5
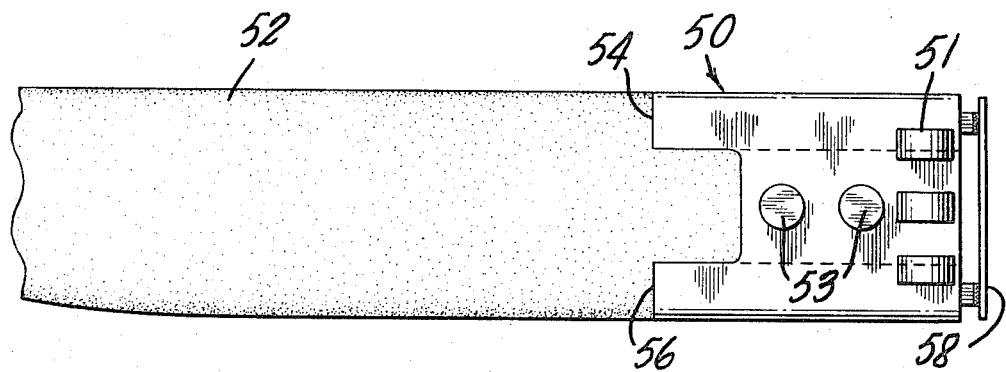
FIG. 6
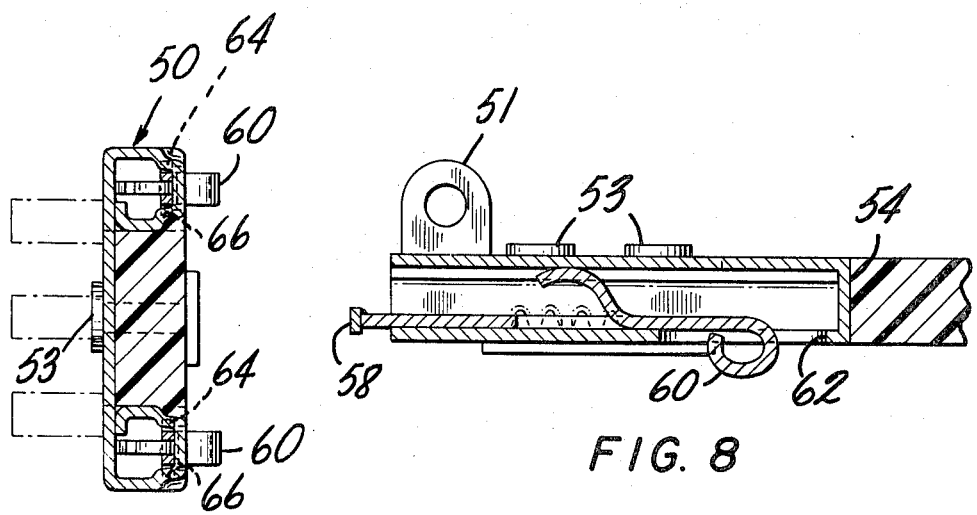
FIG. 7
FIG. 8

EYEGLASS FRAME ADJUSTER

BACKGROUND OF THE INVENTION

The invention relates to eyeglass frame adjusters and, more particularly, to a unique and novel structure for simply and selectively varying the contact pressure between the arms of an eyeglass frame and the temples of the user.

Eyeglasses have long presented problems to their users in terms of a proper fit. When first purchasing a set of glasses, it is often necessary to have them manually bent and formed to fit securely. After extended periods of use, the frame arms tend to become distorted, and the angle between each arm and the frontal lens carrying frame gradually increases beyond the normal 90°. As a result, the glasses must be refitted periodically at some expense to the wearer. Moreover, although a pair of eyeglasses generally will fit properly for ordinary use, particular activities and occupations may require additional contact pressure between the frame arms and the wearer's temples. For example, otherwise properly fitting glasses will slip and slide on temples wet from perspiration or be jarred loose upon contact or fall off the wearer when inverted.

In view of this, previous attempts have been made to make frames easier to adjust and to increase their usable life. One previous device, disclosed in the Speer U.S. Pat. No. 2,567,314, involves a frame arm adjusting system utilizing a spring mounted in the arm to provide contact pressure and a cam device to allow adjustment of the spring. Another device, disclosed in the Parsell U.S. Pat. No. 2,756,632, utilizes a screw inserted through the temple at an acute angle to contact the arm and frame interface. Selective rotation of the screw varies the arm-frame angle. The Speer device is susceptible to damage because of the small dimensions of the spring, and it makes the eyeglasses cumbersome to put on. The Parsell adjuster requires a screwdriver, which is an inconvenience to one desiring to make immediate, temporary adjustments.

SUMMARY OF THE INVENTION

The present invention improves upon past efforts and is a simple durable, manually operated device which permits quick temporary or permanent adjustments in contact pressure between the frame arms and the wearer's temples.

The device comprises a sliding adjustable mechanism which selectively controls the outward angular movement of the eyeglass frame arm to any desired degree. The adjustment mechanism is preferably made of resilient material and is held in place by protrusions extending from its surface which releasably engage serrations formed in a stationary casing member mounted within or around the arm of the eyeglass frame. One end of the mechanism projects beyond the hinged end of the arm and into the interface between the arm and the frontal lens holding frame.

Adjustments are made by manually deflecting the mechanism so as to disengage the protrusions from the serrations of the casing and moving the mechanism lengthwise within the casing toward and away from the end portion of the frontal lens carrying frame to vary the separation between the arm and the frontal lens carrying frame. In one embodiment, the casing is clamped onto each arm of existing eyeglasses and in another embodiment, the casing is designed as an integral part of the frame arm and installed at the time of manufacture.

BRIEF DESCRIPTION OF THE DRAWINGS

In the Drawings:

FIG. 1 is a perspective view of a typical frame adjuster clamped on an eyeglass frame arm arranged according to the present invention;

FIG. 2 is a sectional view, partly broken away, of the clamp-on type adjuster shown in FIG. 1;

FIG. 3 is a cross-sectional view of the clamp-on frame adjuster taken along view line 3—3 of FIG. 2;

FIG. 4 is a side elevational view, partly in section, of a frame adjuster formed as an integral component of an eyeglass frame arm and arranged according to the present invention;

FIG. 5 is an outside elevational view, partly in section, of a frame adjuster formed as an integral component of the hinge assembly of an eyeglass frame arm and arranged according to the present invention;

FIG. 6 is an inside elevational view of the frame adjuster of FIG. 5;

FIG. 7 is a cross-sectional view of the frame adjuster taken along line 7—7 of FIG. 5; and FIG. 8 is a cross-sectional view of the frame adjuster taken along line 8—8 of FIG. 5.

DESCRIPTION OF THE PREFERRED EMBODIMENT

IN a typical clamp-on frame adjuster 10 arranged according to the present invention, as shown in FIGS. 1-3, the frame adjuster comprises a stationary casing 12 mounted on each arm 13 of an eyeglass frame and a slidable adjustment spring 14 mounted within the casing 12. The casing 12, which is preferably made of resilient lightweight and durable material, such as aluminum, plastic, or the like, has a generally C-shaped configuration. It is essential to the successful operation of the present invention that the casing 12 retain a fixed position on the arm 13 of the eyeglass frame. To this end, the overall height of the casing 12 is preferably selected so that a strong pressure fit is achieved between the casing 12 and the arm 13 and the interior surfaces of the legs 16 of the casing conform with the shape of the upper and lower surfaces of the arm 13. It will be understood that other constructions and methods for securing the casing 12 to the arm 13 of the eyeglass frame may be utilized in carrying out the present invention.

The body of the casing 12, which is contiguous with the outside surface of each frame arm 13, has an opening 18 formed therein for receiving the adjustment spring 14. As best shown in FIG. 2, the top and bottom walls defining the opening 18 of the casing body have impressed therein aligned and calibrated serrations or grooves 20. Communicating with the opening 18 are a pair of aligned elliptically shaped openings 22 formed in the top and bottom walls defining the opening 18 adjacent the end of the casing 12 which is removed from the frontal lens carrying frame (not shown).

The adjustment spring 14, like the casing 12, is preferably made of a resilient lightweight and durable material, such as aluminum, plastic, or the like. The spring 14 has a generally U-shaped configuration and includes at its ends a pair of knobs or protrusions 24 which are shaped to extend through the slots 22 in the casing 12. In addition, the exterior edges of the spring's legs have calibrated protrusions or teeth 26, in a generally sawtooth configuration, which are adapted to engage calibrated serrations 20 in the casing 12. The resilient material from which the spring 14 is manufactured will cause the teeth of the spring to firmly engage the casing serrations 20. The spring 14 is fitted into the casing 12, open end first, until the knobs 24 extend through the slots or openings 22 in the casing 12.

The relationship between the sizes of the spring knobs 24 and the openings 22 is such that movement by the knobs 24 within the openings toward and away from the frontal lens carrying frame will cause, respectively, the base of the spring 14 to extend beyond the arm 13 into the interface between the arm and the frontal lens carrying frame (as shown in FIGS. 1 and 2) and the base of the spring to retract almost completely within the body of the casing 12. It will be understood that the greater the distance between the frontal lens carrying frame and the arms 13, the more acute will be the angle between the arms 13 and the frontal lens carrying frame.

In a typical built-in frame adjuster, as shown in FIG. 4, the casing 30 forms an integral inner part of the frame arm 32. As shown in FIG. 4, the casing 30 merely comprises a pair of openings formed in the plastic material forming the eyeglass arms.

Specifically, the casing 30 includes a pair of hollow frame members 34 and 36 extending lengthwise of the arm 32 and adjacent the upper and lower surfaces thereof for receiving a generally U-shaped adjustment spring 38. The spring 38 includes at its ends knobs 40 which extend laterally away from the legs of the spring and which are adapted to extend through openings 42 formed in the side wall of the arm 32.

In contrast to the clamp-on type adjuster, both the upper and lower surfaces of the legs of the spring 38 include calibrated teeth 44 which are adapted to engage firmly correspondingly calibrated grooves or serrations 46 formed in the upper and lower walls defining the pair of openings in members 34 and 36.

Further, the slide depressor action is in the horizontal plane from outside to inside as compared to the clamp-on type depressor action which is in the vertical plane. Accordingly, the serrations 46 in the casing and the teeth 44 in the adjustment spring 38 do not extend the full width of the arm 32. Rather the serrations extend inwardly from the outside of the casing only a fraction of the width of the frame arm so that the inward depression of the spring 38 will bring about a displacement between the teeth 44 of the spring and the serrations 46 formed in the top and bottom walls of the openings in members 34 and 36.

As with the clamp-on type embodiment of the present invention, movement by the knobs 40 within the openings 42 toward and away from the frontal lens carrying frame will cause, respectively, the base of the spring to extend beyond the arm 32 into the interface between the arm and the frontal lens carrying frame and the base of the spring to retract almost completely within the openings of the frame members 34 and 36.

In another typical built-in frame adjuster, as shown in FIGS. 5-8, the casing 50 is made of the same metal that the hinge elements 51 are made of and may be stamped or otherwise formed when the hinge elements are formed. In this embodiment, the casing forms an integral part of the lateral frame hinge and is mounted to the eyeglass frame arm 52 by a pair of rivets 53 that extend through the frame arm and the casing.

As shown in FIGS. 5-8, the casing 50 has a generally U-shaped configuration with a pair of hollow frame members 54 and 56 extending lengthwise of the eyeglass frame arm 52. Like the embodiment shown in FIG. 4, the frame members 54 and 56 are adapted to receive a generally U-shaped adjustment spring 58 which includes at its ends knobs 60 that extend laterally away from the legs of the spring and which are adapted to extend through openings 62 formed in the side walls of the frame members 54 ad 56.

Both the upper and lower surfaces of the legs of the spring 58 include a protruding portion 64 which are adapted to engage firmly corresponding calibrated serrations 66 formed in the upper and lower walls defining the longitudinal openings in the frame members 54 and 56. The slide adjuster action is in the horizontal plane from outside to inside as compared to the clamp-on type adjuster action which is in the vertical plane. Accordingly, the serrations 66 in the casing and the protruding teeth 64 in the adjustment spring 58 do not extend the full width of the longitudinal openings formed in the frame members 54 and 56. Rather the serrations extend inwardly from the outside of the casing only a fraction of the width of the openings formed in the frame members 54 and 56 so that the inward depression of the spring 58 will bring about a displacement between the teeth 64 of the spring and the serrations 66 formed in the top and bottom walls of the members 54 and 56.

As with the clamp-on type embodiment of the present invention, movement by the knobs 60 within the openings 62 toward and away from the frontal lens carrying frame will cause, respectively, the base of the spring to extend beyond the arm 52 into the interface between the arm and the frontal lens carrying frame and the base of the spring to retract almost completely within the openings of the frame members 54 and 56.

In the opertion of either the clamp-on type frame adjuster shown in FIGS. 1-3 or the built-in type adjusters shown in FIGS. 4 and 5-8, the adjustment spring is moved lengthwise within the casing by first deflecting the spring to disengage the teeth of the spring from the serrations formed in the body of the casing. To decrease the angle between the arms and the frame and thereby increase the contact pressure between the arms and the temples of the user, the spring is then moved to a desired position toward the frontal lens carrying frame. To increase the angle between the arms and the frame and thereby decrease the contact pressure between the arms and the frame and the temples of the user, the spring is moved away from the frontal lens carrying frame. At the desired contact pressure, the user releases the deflecting pressure upon the spring to allow the teeth of the spring to engage the serrations of the casing and lock the spring in place.

In view of the foregoing, it can be seen that the present invention provides a unique and novel structure for simply and selectively varying the contact pressure between the arms of an eyeglass frame and the temples of the user. No matter what the activity engaged in, the wearer will always have properly fitting glasses.

Although the invention has been described herein with reference to specific embodiments, many modifications and variations therein will readily occur to those skilled in the art. Accordingly, all such variations

I claim:

1. An eyeglass frame adjuster comprising a pair of stationary casing members each forming a part of one arm of the eyeglass frame and a resilient adjustment means mounted within each casing member and movable in increments lengthwise within the casing member toward and away from the frontal lens carrying frame to vary the distance between the frame arm and the frontal lens carrying frame and thereby vary the angle between the frame arm and the frame, the resilient adjustment means comprising a resilient spring generally of U-shaped configuration including legs formed with calibrated teeth along at least a portion of the exterior surface of each leg and each casing member comprising correspondingly spaced grooves formed in its interior surface for receiving the teeth of the spring and including means for moving and locking the spring in a fixed position within the casing member in order to fix the angular displacement of the eyeglass frame arm.

2. An eyeglass frame adjuster according to claim 1 wherein the spring has a pair of knobs extending perpendicularly of the legs of the spring at the ends thereof, and wherein the casing member has openings in its upper and lower walls for receiving the knobs to thereby permit the application of pressure to the knobs to force the legs of the spring together and out of engagement with the casing member and enable the lengthwise movement of the spring within the casing member over a distance controlled by the knob receiving openings in the casing member.

3. An eyeglass frame adjuster according to claim 2 wherein the casing member has a generally C-shaped configuration adapted for pressure fitting engagement with the arm of the eyeglass frame with the body of the casing member extending alongside the exterior surface of the arm and including serrated top and bottom walls defining an opening therein for receiving the U-shaped spring in releasable locking engagement.

4. An eyeglass frame adjuster according to claim 1 wherein each casing member comprises means defining a pair of openings lengthwise within the arm of the eyeglass frame and including top and bottom walls for the openings formed with serrations extending along the length thereof but only partially across said top and bottom walls for receiving the spring in releasable locking engagement.

5. An eyeglass frame adjuster according to claim 5 wherein the spring has a pair of knobs extending laterally of the legs of the spring at the ends thereof, and wherein the casing member has upper and lower openings in its exterior side wall for receiving the knobs to thereby permit the application of pressure to the knobs to force the legs of the spring out of engagement with the casing member and enable the lengthwise movement of the spring within the casing member over a distance controlled by the knob receiving openings in the casing member.

6. An eyeglass frame adjuster according to claim 1 wherein each casing member forms a part of a hinge assembly for the eyeglass frame and wherein each casing member comprises means defining a pair of openings lengthwise within the arm of the eyeglass frame and including top and bottom walls for the openings formed with serrations extending along the length thereof but only partially across said top and bottom walls for receiving the spring in releasable locking engagement.

7. An eyeglass frame adjuster according to claim 6 wherein the spring has a pair of knobs extending laterally of the legs of the spring at the ends thereof, and wherein the casing member has upper and lower openings in its exterior side wall for receiving the knobs to thereby permit the application of pressure to the knobs to force the legs of the spring out of engagement with the casing member and enable the lengthwise movement of the spring within the casing member over a distance controlled by the knob receiving openings in the casing member.

8. An eyeglass frame adjuster according to claim 7 wherein each casing member conforms to the contour of the frame arm and further comprising means for bolting the casing member to the frame arm.

* * * * *

PO-1050
(5/69)

UNITED STATES PATENT OFFICE
CERTIFICATE OF CORRECTION

Patent No. 3,759,608            Dated September 18, 1973

Inventor(s) William B. McVeigh

It is certified that error appears in the above-identified patent and that said Letters Patent are hereby corrected as shown below:

Column 1, line 28, "2,567,314" should be --3,567,314--; and

Column 6, line 8, "claim 5" should be --claim 4--.

Signed and sealed this 2nd day of April 1974.

(SEAL)
Attest:

EDWARD M. FLETCHER, JR.
Attesting Officer

C. MARSHALL DANN
Commissioner of Patents